United States Patent
Hsieh et al.

(10) Patent No.: US 7,136,129 B2
(45) Date of Patent: Nov. 14, 2006

(54) IN-PLANE SWITCHING LIQUID CRYSTAL DISPLAY DEVICE WITH PROTRUSIONS INTO THE LIQUID CRYSTAL LAYER AND METHOD OF MANUFACTURING THE SAME

(75) Inventors: Tsau-Hua Hsieh, Miao-Li (TW); Jia-Pang Pang, Miao-Li (TW); Cheuh-Ju Chen, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 0 days.

(21) Appl. No.: 10/818,905

(22) Filed: Apr. 5, 2004

(65) Prior Publication Data

US 2004/0196426 A1    Oct. 7, 2004

(30) Foreign Application Priority Data

Apr. 4, 2003    (TW) .............................. 92107707 A

(51) Int. Cl.
*G02F 1/1343* (2006.01)

(52) U.S. Cl. ...................... 349/141; 349/160; 349/138; 349/156

(58) Field of Classification Search ................ 349/114, 349/141
See application file for complete search history.

(56) References Cited

U.S. PATENT DOCUMENTS

| 5,093,738 | A | * | 3/1992 | Watanabe et al. ........... 349/106 |
| 5,600,464 | A | | 2/1997 | Ohe et al. |
| 6,433,852 | B1 | | 8/2002 | Sonoda et al. |
| 6,762,815 | B1 | * | 7/2004 | Lee ............................ 349/141 |
| 6,862,050 | B1 | * | 3/2005 | Rho et al. ...................... 349/44 |
| 2003/0133062 | A1 | * | 7/2003 | Maeda ........................ 349/113 |

* cited by examiner

*Primary Examiner*—Andrew Schechter
*Assistant Examiner*—Richard Kim
(74) *Attorney, Agent, or Firm*—Wei Te Chung

(57) ABSTRACT

The present invention provides an in-plane switching liquid crystal display (IPS-LCD) device that includes a substrate, a protrusive layer having many protrusions on the substrate and a transparent electrode on each of the protrusions. One may dispose a color filter on the protrusions and fill in liquid crystal material between the color filter and the substrate. In contrast to conventional IPS-LCD devices, the IPS-LCD device of the present invention does not require the use of spacers. The present invention may thus largely enhance the light penetration rate and simplify the manufacturing process.

16 Claims, 4 Drawing Sheets

IN-PLANE SWITCHING LIQUID CRYSTAL DISPLAY DEVICE WITH PROTRUSIONS INTO THE LIQUID CRYSTAL LAYER AND METHOD OF MANUFACTURING THE SAME

BACKGROUND OF THE INVENTION

1. Field of the Invention

The present invention relates generally to a liquid crystal display (LCD) device and a method for manufacturing the same, and more particularly to an in-plane switching liquid crystal display (IPS-LCD) device and a method for manufacturing the same.

2. Prior Art

The invention of liquid crystal display (LCD) devices has revolutionized the way information is displayed. Its overwhelming application in almost all aspects of electronic products guaranteed its success in the market. However, for many years, LCD devices have suffered from its narrow viewing angles. This drawback is solved by many techniques. Among them, the most popular one is the so-called in-plane switching (IPS) technique, which is disclosed in U.S. Pat. No. 5,600,464, for example.

Referring to FIG. 3, a conventional IPS-LCD device 100 is illustrated. The IPS-LCD device 100 comprises a source line 102, a gate line 104, a common line 112, at least a counter electrode 114, at least a pixel electrode 116, and a thin film transistor (TFT) 106. The IPS-LCD device 100 further comprises an insulating layer 103 electrically separating the common line 112 and the source line 102, an insulating layer 105 electrically separating the gate line 104 and the source line 102, and at least a via 113 electrically connecting the counter electrode 114 with the common line 112.

Referring to FIG. 4A and FIG. 4B, cross-sectional views taken along line II—II of FIG. 3 are illustrated. As shown in FIG. 4A and FIG. 4B, the IPS-LCD device 100 comprises a substrate 101, the source line 102, at least the counter electrode 114, at least the pixel electrode 116, a spacer 107, a color filter 109, and liquid crystal material 120. The source line 102, the counter electrode 114 and the pixel electrode 116 are disposed on the substrate 101. The presence of the spacer 107 provides room between the color filter 109 and the substrate 101 so as to fill in the liquid crystal material 120. The IPS-LCD device 100 shown in FIG. 4A does not supply an electric field to the liquid crystal material 120. Referring to FIG. 4B, an electric field is now supplied to the liquid crystal material 120. The liquid crystal material 120 is thus rotated and aligned in response to the electric field supplied. The curved lines each having an arrow at one end, as shown in FIG. 4B, represent the electric field lines.

It is clearly seen from FIG. 4B that the electric field supplied to the liquid crystal material 120 near the substrate 101 is stronger than that supplied to the liquid crystal material 120 near the color filter 109. Therefore, the rotation angle of the liquid crystal material 120 adjacent the color filter 109 is less than that of the liquid crystal material 120 adjacent the substrate 101. These inhomogeneous rotation angles of the liquid crystal material 120, resulting from the inhomogeneous electric field distribution, may reduce the light penetration rate, hence lowering the display quality.

SUMMARY OF THE INVENTION

In accordance with the above and other reasons, one objective of the present invention is to provide an in-plane switching liquid crystal display (IPS-LCD) device and a manufacturing method thereof so as to supply a homogeneous electric field distribution.

Another objection of the present invention is to provide an IPS-LCD device and a manufacturing method thereof that do not require the use of spacers.

In order to achieve the above objectives, the present invention of an IPS-LCD device comprises a substrate, a protrusive layer having a plurality of protrusions and a transparent electrode on each of the protrusions of the protrusive layer. The transparent electrode on each of the protrusions is either a pixel electrode or a counter electrode. By covering a color filter on the protrusions, liquid crystal material may be filled in between the color filter and the substrate. Once the IPS-LCD device is switched on, a homogeneous electric field distribution is generated between the pixel electrode and the counter electrode. The liquid crystal material thus rotates to approximately the same angle due to the homogeneous electric field distribution. Therefore, the IPS-LCD device of the present invention has a higher light penetration rate. Furthermore, the IPS-LCD device of the present invention employs a plurality of protrusions to replace the conventional spacers. The manufacturing process is thus integrated to the fabrication of the protrusion layers, and therefore is reduced.

BRIEF DESCRIPTION OF THE DRAWINGS

The present invention is better understood by referring to the detailed description of the preferred embodiment taken in conjunction with the drawings, wherein:

FIGS. 4A and 48 illustrate cross-sectional views taken along line II—II of FIG. 3.

DETAILED DESCRIPTION OF THE INVENTION

Hereinafter, the present invention is described in detail by incorporating with the accompanied drawings. For the convenience of explanation, it is appreciated that these drawings are not drawn to scale, but are schematic only.

Figure 1:
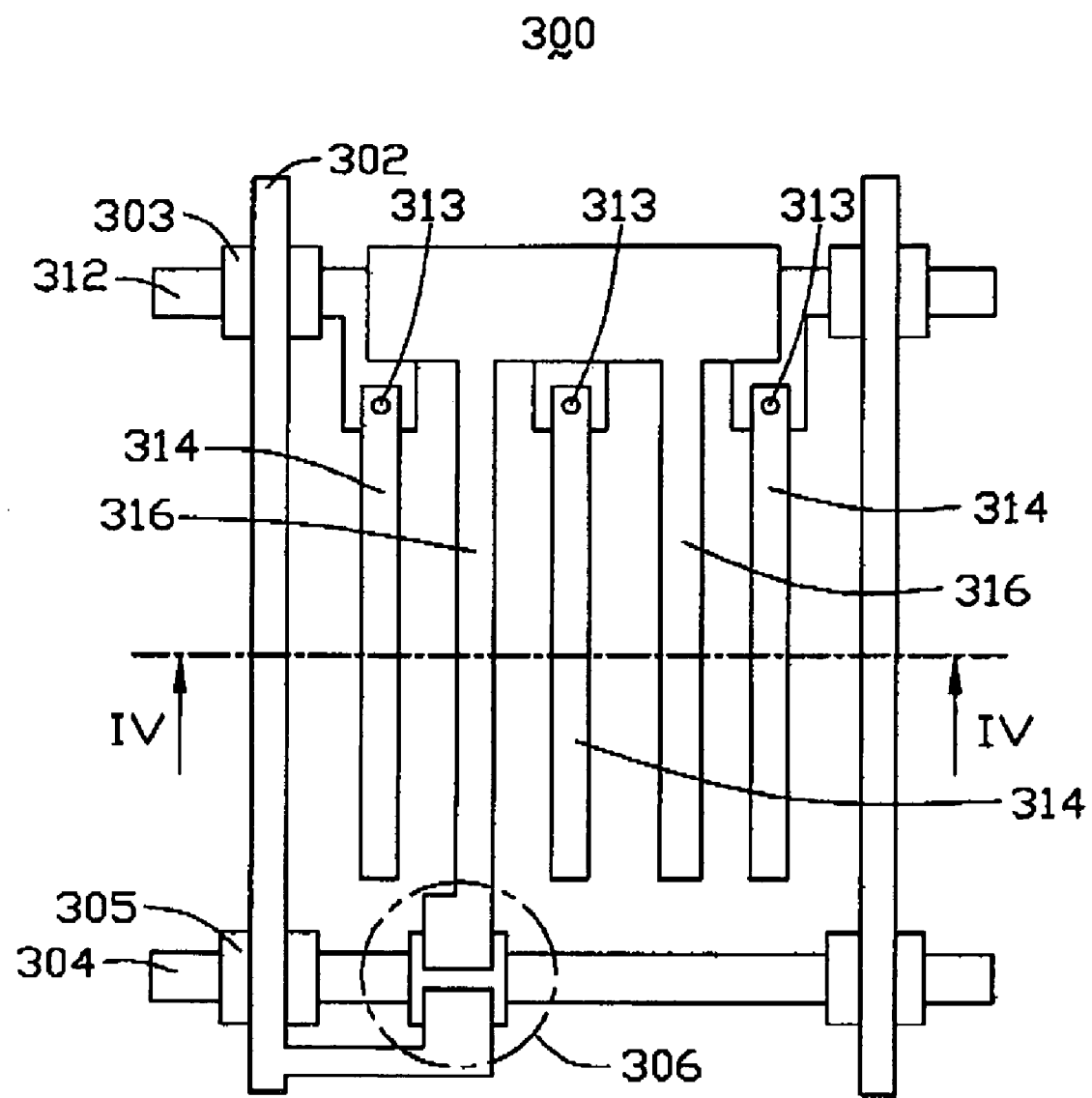
FIG. 1 illustrates an device according to the present invention.

Referring to FIG. 1, an IPS-LCD device 300 of the present invention is illustrated. The IPS-LCD device 300 comprises a source line 302, a gate line 304, a common line 312, at least a counter electrode 314, at least a pixel electrode 316, and a thin film transistor (TFT) 306. In the illustrated embodiment, a plurality of counter electrodes 314 and pixel electrodes 316 are provided. The source line 302 crosses the gate line 304 and the common line 312, thus defining a unit pixel as shown in the drawing. The IPS-LCD device 300 further comprises an insulating layer 303 electrically separating the common line 312 and the source line 302, an insulating layer 305 electrically separating the gate line 304 and the source line 302, and at least a via 313 electrically connecting the counter electrodes 314 with the common line 312. In the illustrated embodiment, a plurality of vias 313 are provided. The counter electrodes 314 and the pixel electrodes 316 are parallel to each other. In addition, the neighboring electrode of each pixel electrode 316 is a counter electrode 314 and vice versa. Furthermore, the TFT 306 of the IPS-LCD device 300 acts as a switch for turning on and turning off the IPS-LCD device 300.

Figure 2A:
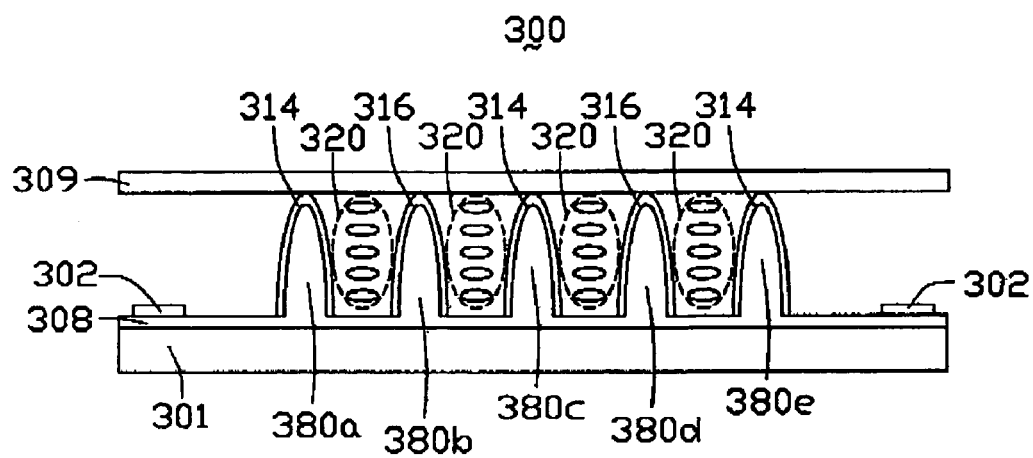
FIGS. 2A and 2B illustrate cross-sectional views taken along line IV—IV of FIG. 1.
Figure 2B:
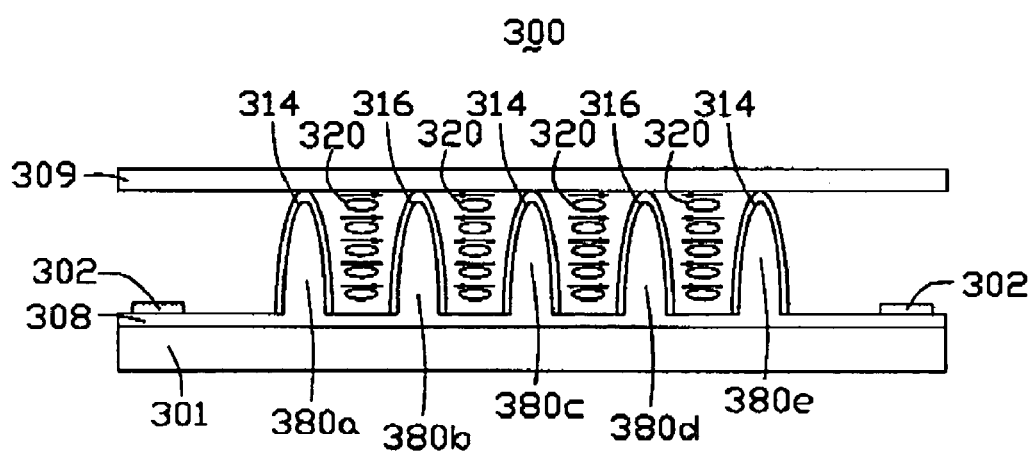
Figure 3:
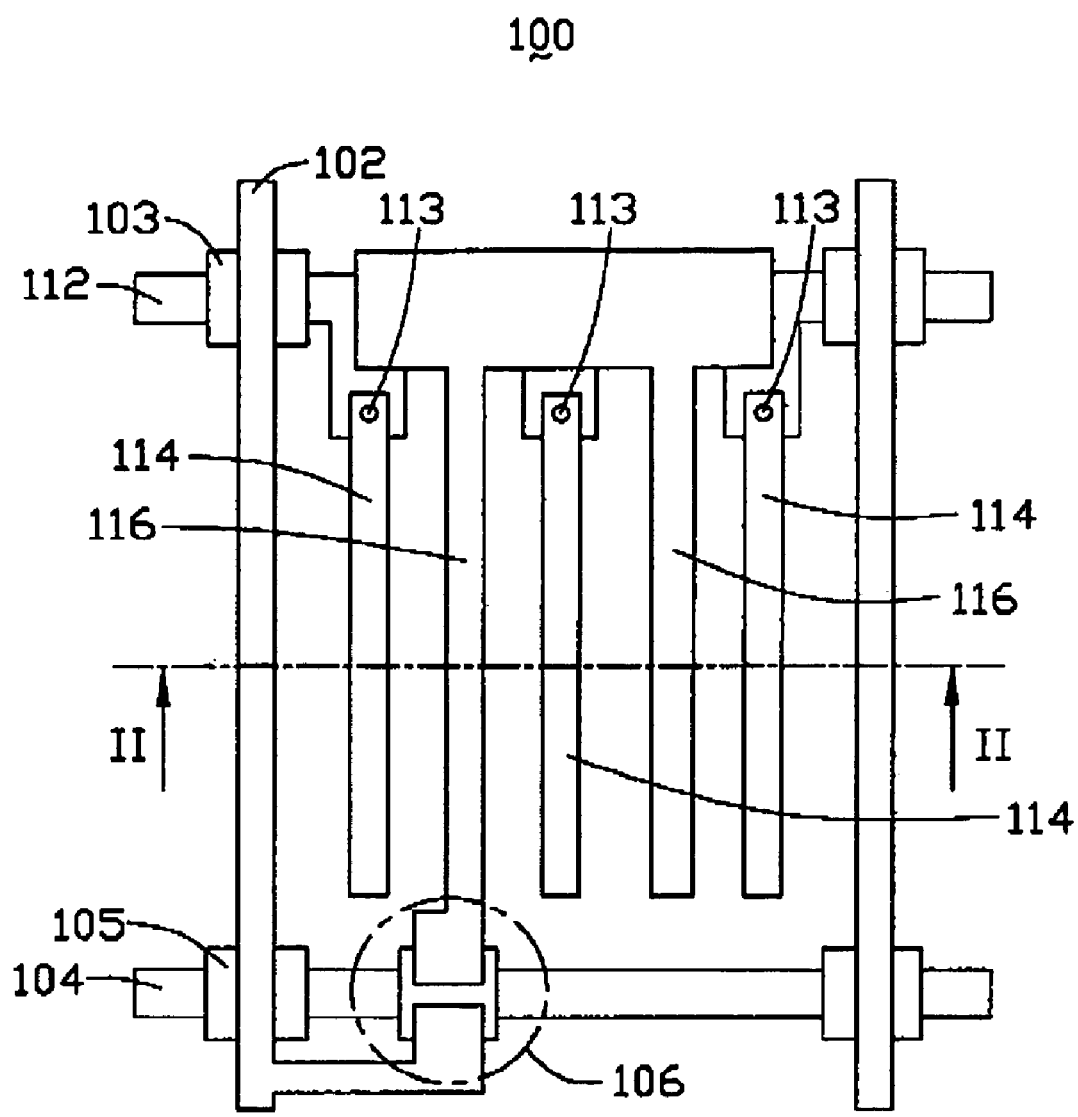
FIG. 3 illustrates a top view of a conventional IPS-LCD device.
Figure 4A:
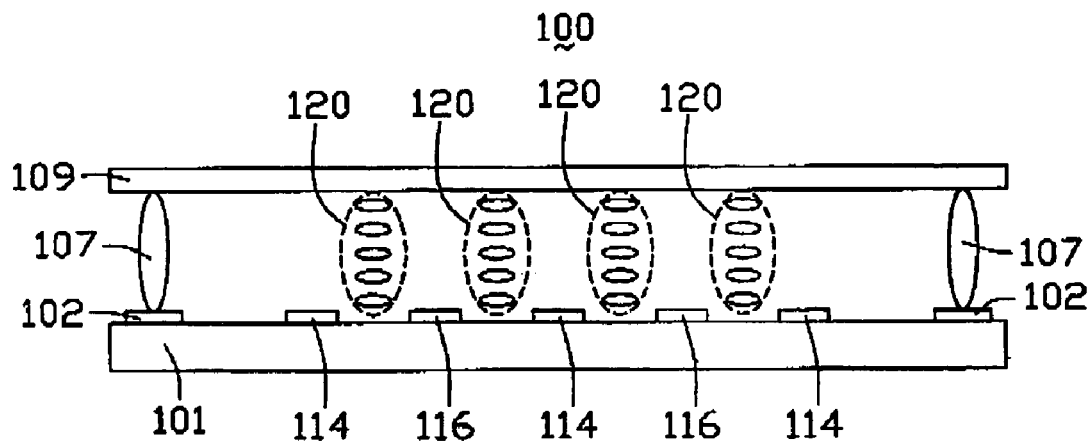
Figure 4B:
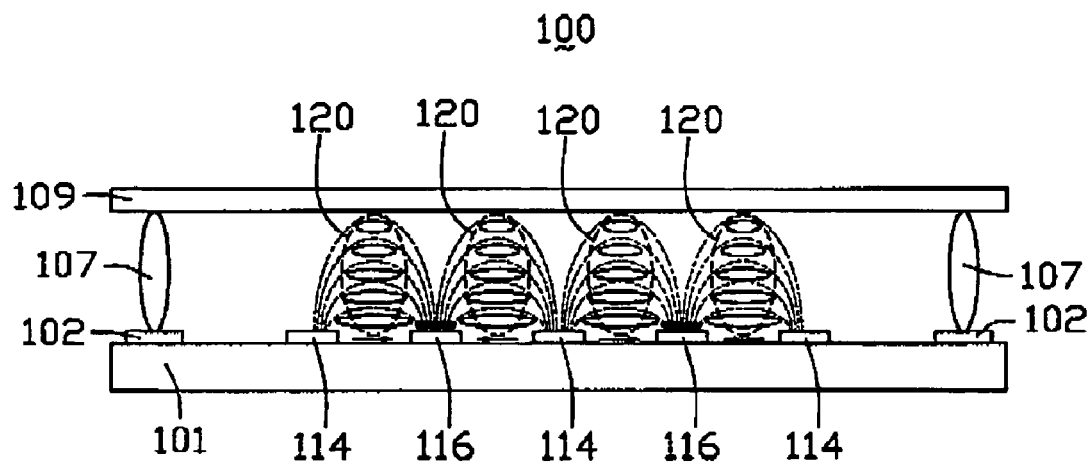

In order to further describe the particular features of the present invention, attention is now directed to FIG. 2A and FIG. 2B, wherein cross-sectional views taken along line IV—IV of FIG. 1 are illustrated. As shown in FIG. 2A and FIG. 2B, the IPS-LCD device 300 comprises a substrate 301, a protrusive layer 308 having a plurality of protrusions 308a, 308b, 308c, 308d, and 308e, at least a counter electrode 314, at least a pixel electrode 316, a color filter 309, and liquid crystal material 320. FIG. 2A, no electric field is supplied to the liquid crystal material 320. The substrate 301 is made of transparent solid materials such as glass and plastic material. The protrusive layer 308 is formed on the substrate 301, and is made of organic materials such as a transparent negative photoresist material. The protrusions 308a, 308b, 308c, 308d, and 308e of the protrusive layer 308 are thus formed by means of photolithography techniques. In this particular embodiment, the protrusions 308a, 308b, 308c, 308d, and 308e protrude into the liquid crystal material 320. The source line 302 is deposited on the protrusive layer 308, not on any of the protrusions 308a, 308c, and 308e. The counter electrodes 314 are deposited on the protrusions 308a, 308c, and 308e, and the pixel electrodes 316 are deposited on the protrusions 308b and 308d. The deposition of the source line 302, the counter electrodes 314 and the pixel electrodes 316 is accomplished by sputtering a transparent conductive material, such as indium-tin-oxide (ITO). The color filter 309 is disposed on and supported by the protrusions 308a, 308b, 308c, 308d, and 308e of the protrusive layer 308. In contrast to the spacer 107 of the conventional IPS-LCD device 100 as shown in FIG. 4A and FIG. 4B, the protrusions 308a, 308b, 308c, 308d, and 308e of the present invention provide room between the color filter 309 and the substrate 301 so as to fill in the liquid crystal material 320.

FIG. 2B illustrates a cross-sectional view taken along line IV—IV of FIG. 1, wherein an electric field is supplied to the liquid crystal material 320. As shown in FIG. 2B, the electric field supplied to the liquid crystal material 320 adjacent the substrate 301 is approximately equal to that supplied to the liquid crystal material 320 adjacent the color filter 309. Consequently, the present invention provides a homogeneous electric field distribution on the liquid crystal material 320, which is advantageous in that the light penetration rate is increased. In addition, the color filter 309 is disposed on and supported by the protrusions 308a, 308b, 308c, 308d, and 308e; that is, the protrusions 308a, 308b, 308c, 308d, and 308e protrude through the liquid crystal material 320 to the color filter 309. Therefore the employment of the protrusions 308a, 308b, 308c, 308d, and 308e means that the spacers 107, shown in FIG. 4A and FIG. 4B are not required.

In summary, the method for manufacturing an in-plane switching liquid crystal display device of the present invention comprises the steps of: providing a substrate; forming an organic material layer on the substrate; etching the organic material layer by means of a photolithography technique so as to obtain a plurality of protrusions; and depositing a transparent electrode on each of the protrusions, wherein the transparent electrode is either a pixel electrode or a counter electrode, whereby a plurality of pixel electrodes and a plurality of counter electrodes are alternately arranged on the protrusions. The method further comprises the steps of: covering a color filter on the protrusions; and filling in liquid crystal material between the color filter and the substrate.

It is appreciated that the above discussion discloses only a preferred embodiment of the present invention. Any person having ordinary skill in the art may easily find various other embodiments equivalent to the present invention. Therefore, the scope of the present invention is covered by the appended claims as set forth in the following.

What is claimed is:

1. An in-plane switching liquid crystal display device, comprising:
    a first substrate;
    a second substrate opposite to the first substrate;
    a liquid crystal layer interposed between the first and second substrates;
    a protrusive layer on said first substrate, said protrusive layer including a plurality of protrusions protruding into the liquid crystal layer; and
    a plurality of transparent electrodes deposited on the protrusions, wherein each of the transparent electrodes is either a pixel electrode or a counter electrode, and the pixel electrodes and the counter electrodes are alternately arranged.

2. The liquid crystal display device of claim 1, wherein said protrusive layer is made of organic material.

3. The liquid crystal display device of claim 2, wherein the organic material comprises a transparent negative photoresist material.

4. The liquid crystal display device of claim 1, further comprising a color filter arranged at said second substrate, said color filter covering the protrusions.

5. The liquid crystal display device of claim 4, wherein the liquid crystal layer is filled in between said first substrate and said color filter.

6. The liquid crystal display device of claim 5, wherein the protrusions protrude through the liquid crystal layer to said color filter.

7. The liquid crystal display device of claim 1, wherein the first substrate comprises a plurality of thin film transistors.

8. The liquid crystal display device of claim 1, wherein the protrusions protrude through the liquid crystal layer to said second substrate.

9. A method for manufacturing an in-plane switching liquid crystal display device, comprising the steps of:
    (a) providing a first substrate;
    (b) forming a protrusive layer having a plurality of protrusions on said first substrate;
    (c) depositing a transparent electrode on each protrusion of said protrusive layer, wherein the transparent electrode is either a pixel electrode or a counter electrode, whereby a plurality of pixel electrodes and a plurality of counter electrodes are alternately arranged on the protrusions;
    (d) providing a second substrate opposite to the first substrate; and
    (e) interposing a liquid crystal layer between the first and second substrates, wherein the protrusions protrude into the liquid crystal layer.

10. The method of claim 9, wherein step (b) further comprises:
    forming an organic material layer on said first substrate; and
    etching the organic material layer by means of a photolithography technique to obtain a plurality of protrusions.

11. The method of claim 10, wherein the organic material layer comprises a transparent negative photoresist material.

12. The method of claim 9, wherein the protrusions protrude through the liquid crystal layer to said second substrate.

13. The method of claim 9, further comprising the step for depositing a color filter at said second substrate, the color filter covering the protrusions.

14. The method of claim 13, wherein the protrusions protrude through the liquid crystal layer to the color filter.

15. An in-plane switching liquid crystal display device, comprising:

a substrate;

a liquid crystal layer adjacent the substrate;

a plurality of protrusions arranged on the substrate and protruding into the liquid crystal layer; and a plurality of transparent electrodes deposited on the protrusions.

16. The in-plane switching liquid crystal display device of claim 15, wherein each of the transparent electrodes is either a pixel electrode or a counter electrode, and the pixel electrodes and the counter electrodes are alternately arranged.

* * * * *